United States Patent
Knight et al.

[15] 3,697,183
[45] Oct. 10, 1972

[54] OPTICAL APPARATUS USING SLITTED MASKS FOR DETECTING ROTARY MOTION OF OBJECT

[72] Inventors: Sheldon Knight, Mountain View; Kerwin Peter McCarron, Sunnyvale, both of Calif.

[73] Assignee: Quantic Industries, Inc., San Carlos, Calif.

[22] Filed: June 14, 1968

[21] Appl. No.: 737,274

[52] U.S. Cl. ............... 356/114, 250/225, 250/237, 356/150, 356/152
[51] Int. Cl. ................... G01b 11/27, G01b 9/10
[58] Field of Search ...... 356/150, 153, 169, 138, 152, 356/170, 114; 350/162; 250/237

[56] References Cited

UNITED STATES PATENTS

| | | | |
|---|---|---|---|
| 3,138,714 | 6/1964 | Heidenhain | 250/237 |
| 3,187,187 | 6/1965 | Wingate | 356/152 |
| 3,326,077 | 6/1967 | Vandermeer | 356/152 |
| 3,360,660 | 2/1967 | Kusch et al. | 356/169 |
| 3,427,463 | 2/1969 | Weyrauch | 250/237 |
| 3,451,054 | 6/1969 | Johnson | 356/169 |
| 3,454,777 | 7/1969 | Marcus | 250/237 |
| 3,487,399 | 12/1969 | Wogatzke | 250/237 |
| 3,502,414 | 3/1970 | Kreckel et al. | 356/169 |

FOREIGN PATENTS OR APPLICATIONS

| | | | |
|---|---|---|---|
| 430,236 | 1967 | Switzerland | 356/169 |
| 726,352 | 1966 | Canada | 356/169 |

*Primary Examiner*—Ronald L. Wibert
*Assistant Examiner*—J. Rothenberg
*Attorney*—Flehr, Hohbach, Test, Albritton & Herbert

[57] ABSTRACT

A digital angle readout subsystem for an infrared horizon tracker provides a position reference for the tracker and a readout counter for indicating the angular displacement of the tracker from the reference position. The tracker is coupled to a movable mirror, which moves in synchronism with the tracker. The mirror reflects light projected through a primary mask and causes the light to strike a secondary mask at a location which varies with movement of the mirror. Photodetectors behind the secondary mask are responsive to the moving light patterns to provide electrical signal indications of the reference position and angular displacement of the mirror. The counting portion of the primary mask has evenly spaced slits and bars, the secondary counting mask includes left and right sections for splitting the field of movement of the tracker into two parts. Each section has four individual subsections shifted 90° in phase from an adjacent subsection. Switching between left and right counting sections is provided by switching pulses produced by primary and secondary reference masks. The reference masks have a pattern based on a $vk\lambda$ mathematical difference set and provide a reference position signal for the tracker.

9 Claims, 7 Drawing Figures

INVENTOR.
Sheldon A. Knight
BY Kerwin Peter McCarron
Attorneys

OPTICAL APPARATUS USING SLITTED MASKS FOR DETECTING ROTARY MOTION OF OBJECT

The present invention is in general directed to optical apparatus and more specifically to apparatus for detecting the angular displacement of a movable object from a reference position of the object.

In the field of space navigation and attitude control, the attitude of the spacecraft must be referenced relative to the earth. As disclosed in copending application, Ser. No. 474,613, now U.S. Pat. No. 3,495,085 in the name of Sheldon A. Knight, entitled "Radiation Gradient Sensing Apparatus" and assigned to the present assignee, one method of referencing is to sense the gradient of infrared radiation between the earth and space. This device is termed an infrared horizon sensor where the sensor "tracks" the horizon. The tracking angle is thus a measure of the pitch or roll of the spacecraft. In order to measure this angle an angle readout subsystem is provided and is also disclosed in the above copending application.

It is a general object of the present invention to provide improved optical apparatus for sensing the angular displacement of a movable object whose angular position is related to that of a horizon sensor.

It is another object of the invention to provide apparatus of the above type which is simpler and more reliable in operation and is capable of covering a relatively wide angular range.

In accordance with the above objects there is provided optical apparatus for detecting the motion of movable objects which includes slitted primary and secondary counting masks. Means are provided for projecting light through the primary mask to strike the secondary mask at a location thereon which varies with movement of the movable object. The invention more specifically, comprises a secondary counting mask having slits therein equal in number per unit length to the primary mask slits. The secondary mask has at least two adjacent sections in a direction perpendicular to the axis of movement of the movable object. The two sections are spaced so that their slits have a 90° phase difference. First and second light sensitive means are behind the two sections.

The optical apparatus of the present invention also determines the angular displacement of the movable object from a reference position. Such apparatus includes primary and secondary reference masks having transparent slits and opaque bars for projecting light through the slits in the primary mask to strike the secondary mask at a location thereon which varies with movement of the movable object. Light sensitive means behind the secondary mask detect the position of the movable object which will cause the slit pattern of the first mask to strike the second mask exactly on the bar pattern of the second mask. This is the angular reference position of the object. The invention comprises secondary and primary reference masks having a predetermined bar and slit patterns, one being the reverse of the other, and the patterns being based on a mathematical constant different set of the $vk\lambda$ type. The modulus, $v$, of the set is the number of units in the set which determines the total number of slits and bars; $k$, is the number of members in the set which determines the number of opaque spaces or bars in the pattern; and $\lambda$ is in mathematical terms the number of ways the differences form in the set. The ratio $(\lambda + 1)/v$ determines the light transmittance of a first and second mask for positions of the movable object other than the reference position.

Other objects of the invention will be more clearly apparent from the following description.

REFERRING TO THE DRAWINGS:

Figure 1:
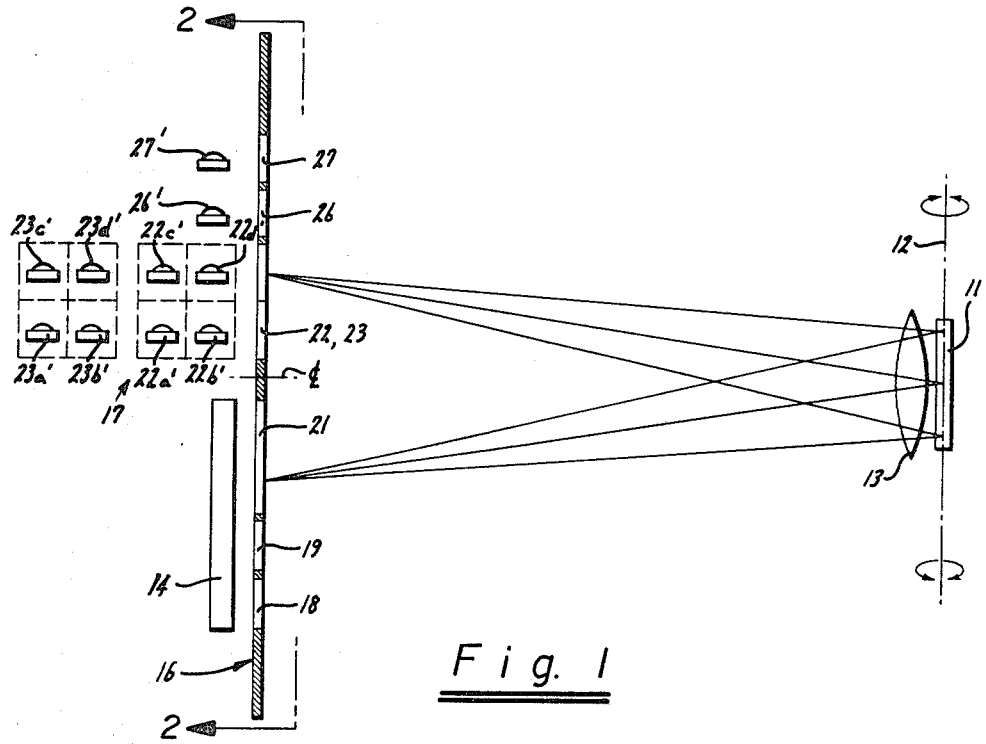
FIG. 1 is a schematic view of an optical readout system embodying the present invention.

Referring first to FIG. 1, a tracking mirror 11 is illustrated which is synchronized for movement with an infrared tracker which is caused to always point at the horizon of the earth. The specific mode of control of this mirror is disclosed in the above pending application. The subsystem of the present invention relates the amount of movement and position of the mirror to the spacecraft in which it is normally installed. In other words, the present invention provides an improved reference means for the readout mirror and an improved counter to determine the angular displacement from this reference position. Mirror 11 rotates about an axis 12 in either of two directions indicated and has in front of it an objective lens 13 for focusing light from a source 14. Light source 14 is located behind a mask assembly 16, shown in plan view in FIG. 2, and projects light through slits in the mask toward mirror 11. Mask 16 includes a primary portion 16a through which light is projected and a secondary portion 16b upon which the light strikes and behind which are located several photodetector devices 17.

Figure 2:
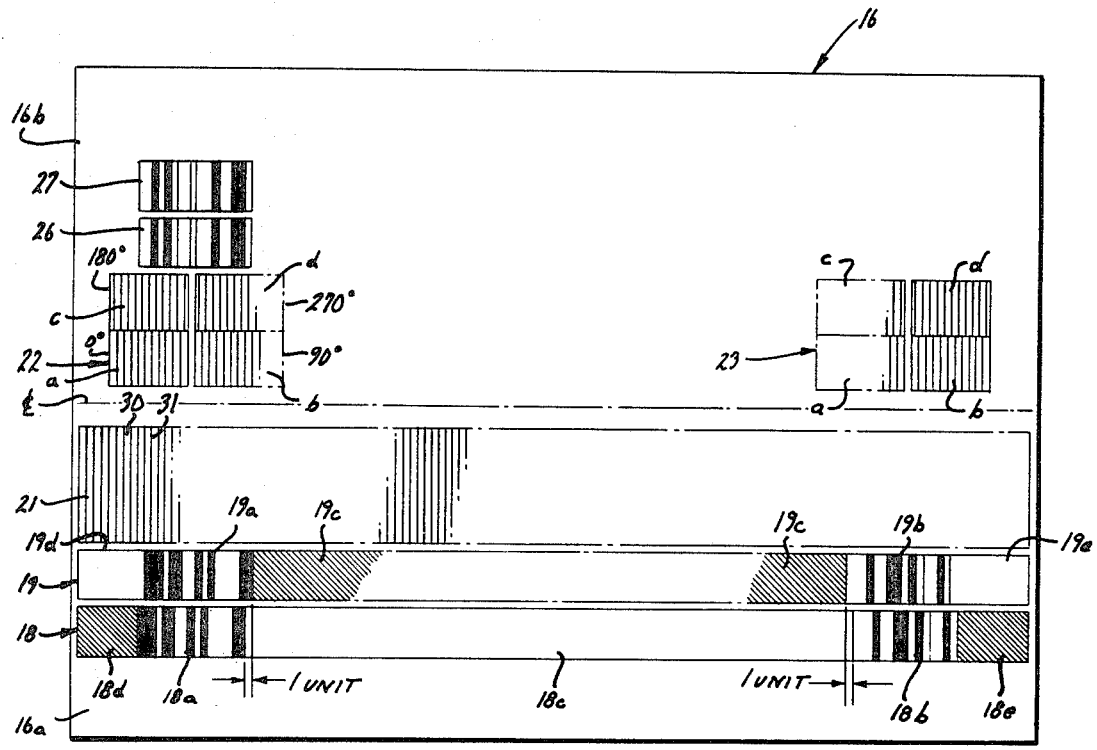
FIG. 2 is a plan view of the mask of the optical apparatus taken along line 2—2 of FIG. 1.

More specifically, and also referring to FIG. 2, the primary mask 16a includes two primary reference masks 18 and 19 and a primary counting mask 21. Reference mask 18 includes a left portion 18a, a right portion 18b, a transparent center portion 18c, and terminating left and right opaque end portions 18d and 18e respectively. Primary reference mask 19 similarly includes left and right portions 19a and 19b, an opaque center portion 19c, and transparent left and right end portions 19d and 19e.

The secondary mask 16b includes two counting clusters 22 and 23 located at the left and right sides of the overall mask 16 respectively. Cluster 22 includes four portions designated a, b, c, and d and similarly cluster 23 includes these four portions.

Secondary mask 16b also includes secondary reference masks 26 and 27 which are located one below the other. Located behind the various secondary masks are photodetector devices 17 the primed mask reference numeral designating the photodetector associated with that particular mask section.

Referring now to the specific construction of the primary counting mask 21 and secondary counting masks 22 and 23 the primary counting mask comprises a series of transparent slits 30 and bars 31 which are equally spaced and having a predetermined number per unit length. Secondary counting masks 22 and 23 have the same number of bars and slits per unit length except that each of the sections a through d are shifted 90° in phase from one another. Thus, in the case of sections $a$ and $c$ for both masks 22 and 23 the slit 30 of one mask will mate with the bar 31 of the other mask.

Figure 6:
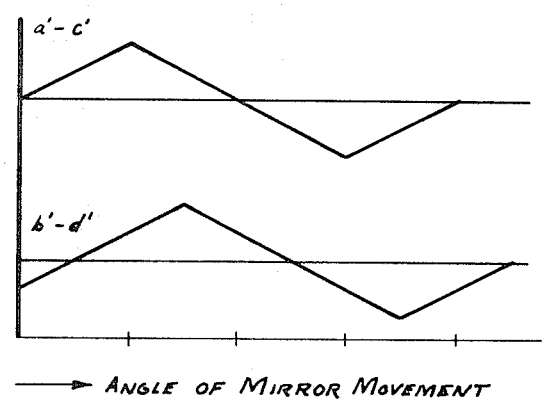
FIG. 6 shows additional curves related to other photodetectors which are useful in understanding the invention.

In operation light from source 14 passes through slits 30 of primary counting mask 21 through the lens 13 and onto the mirror 11 where it is reflected back to the lens and imaged on either the secondary counting mask 22 or the secondary counting mask 23 depending on the mirror position. The effect of the superimposed masks will be to create a variation in light level as detected by photodetectors $23a'$ through $23d'$ and $22a'$ through $22d'$ between a dark level where a superimposed primary pattern of slits is in coincidence with the bars of the secondary pattern and a 50 percent light level where the patterns exactly mate. Thus, movement of mirror 11 will vary the light level between a 0 percent and 50 percent level to create the photodetector waveforms as shown in FIG. 6.

More specifically, the waveform designated $a' - c'$ is the combined differential signal output of photodetectors $23a'$–$23c'$ or $22a'$–$22c'$. The same is true of the photodetectors $b'$–$d'$. The $a'$–$c'$ curve is termed an inphase output and the $b'$–$d'$ curve a quadrature output since it is shifted 90° from the other curve. As is more fully explained in the Knight Copending Application, the two curves provide both counting information and direction of movement either towards space or the earth.

The primary and secondary reference masks 18, 19 and 26, 27 are constructed from a mathematical constant difference set of the $vk\lambda$ type. More specifically, $v$ is the modulus of the set which is the number of units in it and which determines the total number of slits and opaque bars; $k$ is the number of members in the set and determines the number of opaque bars in the pattern; and $\lambda$ is in mathematical terms the number of ways the differences form in the set. As illustrated, although the two patterns of the primary and secondary reference masks are similar, the secondary reference masks 26 and 27 are reversed as compared to their corresponding primary. The ratio $(\lambda + 1)/(v)$ determines the light transmittance of the primary and secondary masks for all normal positions other than the reference position where there is total light extinction because of the reversal of the secondary masks.

Figure 3:
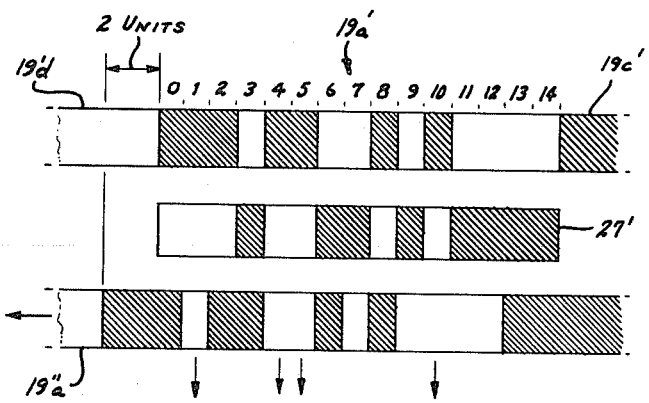
FIG. 3 is a greatly enlarged view of a representative reference mask which is useful in demonstrating the layout of the actual reference mask.

The $vk\lambda$ type pattern is more specifically illustrated in FIG. 3 which shows a representative pattern which has been simplified and has fewer bars and slits than does the specific pattern of the present invention. Mask $19a'$ represents primary reference mask 19a with a transparent left end $19d'$ and opaque right connecting portion $19c'$. Mask $27'$ represents secondary reference mask 27 and $19''a$ the primary reference mask $19'a$ as it would be imaged on the secondary reference mask if the mirror 11 (FIG. 1) had moved 2 units. The units are represented as zero through 14 and represent the 15 units of the modulus which is in this specific example a modulus of v equal to 15. Furthermore in this example, $k$ is equal to 7 and $\lambda$ is equal to 3 with a geometry of 0, 1, 2, 4, 5, 8, 10; this geometry indicates the units of the pattern which are opaque or bars. The others are transparent or slits. As illustrated secondary reference mask $27'$ is the exact reverse of mask $19'a$ and in this position there would be a total extinction of light. However, by shifting the associated mirror so that the image of mask $19a'$ has been moved 2 units as illustrated by $19''a$, four units or slits of the mask now transmit light as indicated by the arrows. These four units represent the constant difference of the constant difference set and over a limited range will determine the transmittance level of the superimposed masks. Of course because of the transparent and opaque end and middle portions $19d'$ and $19c'$ the transmittance will gradually rise to a maximum or decrease to a minimum. This is illustrated in FIG. 5 by the curves $26''$ and $27''$ which represent the voltage outputs of photodetectors $26'$ and $27'$ which are behind the secondary reference masks 26 and 27.

Figure 5:
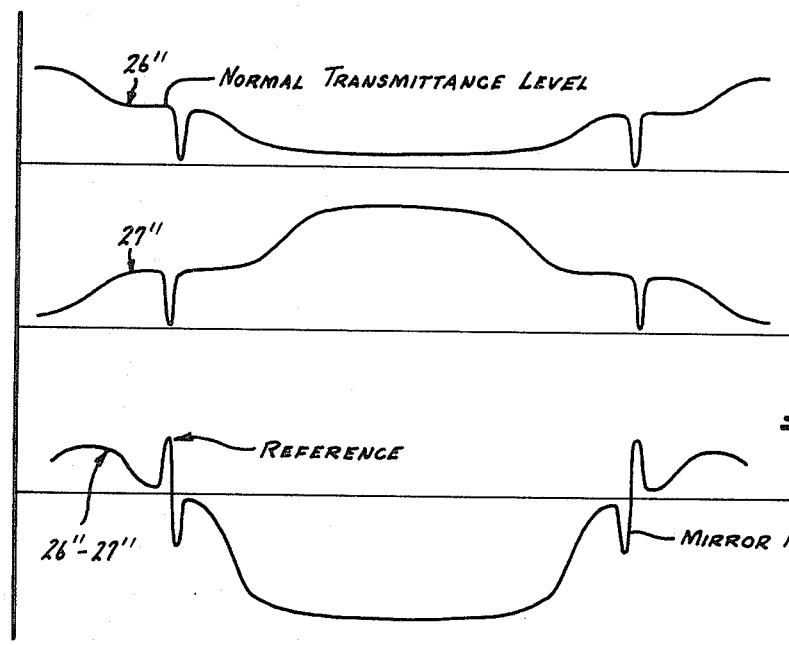
FIG. 5 shows curves of the signal outputs of photodetectors employed in the present invention which are useful in understanding the invention.

Referring now more specifically to FIG. 5 detectors $26'$ and $27'$ are serially connected in opposed phase so that the resultant output voltage is represented by $26''$ minus $27''$. Moreover, referring to FIG. 2, since the pattern 18a is shifted one unit from 19a and the same is true of 18b and 19b, the reference position where the imaged patterns provide total extinction of light are offset one unit. This provides a double polarity pulse. The pulse associated with masks 18a and 19a is termed a reference pulse and that associated with masks 18b and 19b represents the normal position of the mirror to the optical axis of its lens. Thus the reference mask provides both a reference pulse indicating the limit of travel of the mirror where counting should begin and a center indication where the mirror is normal to the optical axis to provide for switching between the secondary counting mask 22 and the secondary counting mask 23.

Figure 2A:
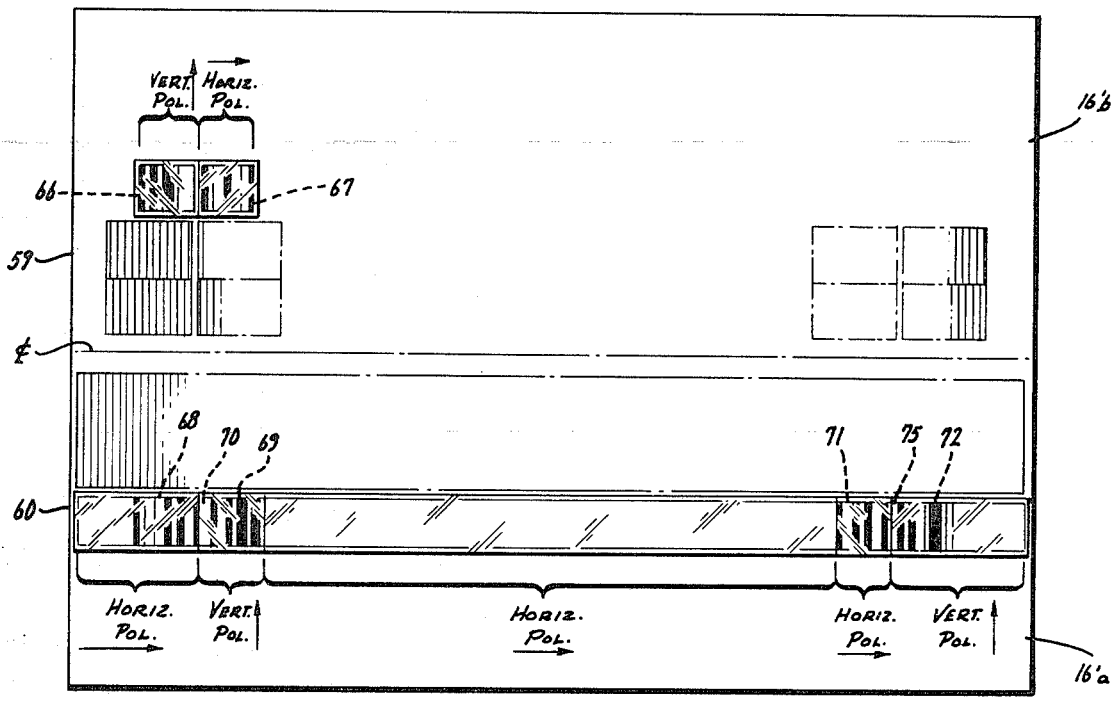
FIG. 2A is an alternative embodiment of FIG. 2.

An alternative embodiment of the reference mask portion of FIG. 2 is shown in FIG. 2A. The counting portions are identical to those of FIG. 2. In the primary portion $16'a$ of the mask a single reference mask 60 replaces the two reference masks 18 and 19 of FIG. 2. Similarly, in the secondary portion $16'b$ a single secondary reference mask track 59 replaces masks 26 and 27. This provides a reduction in the required field coverage of the readout lens and allows simplification of the illumination system.

Figure 4:
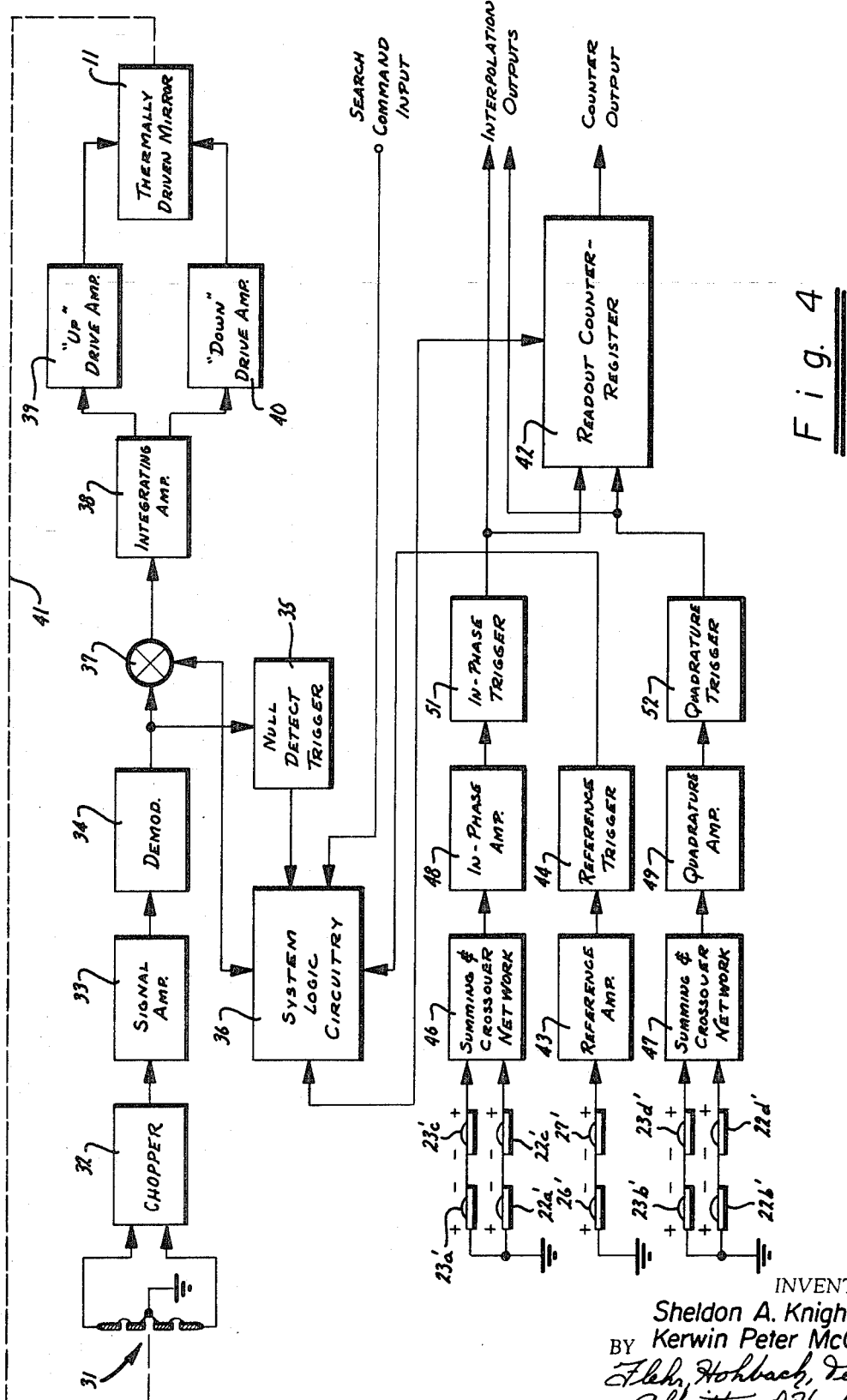
FIG. 4 is a block diagram showing suitable electronic circuitry associated with the optical apparatus of the present invention.

More specifically, primary reference masks 68 and 69 correspond to masks 18a and 19a (FIG. 2) and are placed in the same horizontal track by use of polarization coding. As indicated, mask 68 is horizontally polarized and mask 69 vertically polarized. The two polarizations thus prevent interference between the reference patterns produced by the masks. These patterns are received by correspondingly polarized secondary reference masks 66 and 67 which have behind them photodetectors corresponding to $26'$ and $27'$ (FIG. 4).

Primary masks 71 and 72 operate in the same manner.

The 1 unit offset of FIG. 2 and its attendant function as explained above is provided in FIG. 2A by a smaller spacing 75 between masks 71 and 72 as compared to spacing 70 between masks 68 and 69. The remainder of mask 60 is polarized as indicated.

Counting masks 22 and 23 are each associated with one-half the field of movement of the mirror 11 (FIG. 1). Thus when the mirror is normal to the optical axis the associated photodetectors $23a'-d'$ and $22a'-d'$ must be correspondedly switched to provide a count for the proper field. Switching the photodetectors allows a lens with half the field coverage that would be required if a single detector set were to be used. Thus the lens required is smaller and simpler in construction than a lens of greater field coverage.

In addition the combination of the $a$ and $c$ patterns provide for a total extinction of light which provides for greater modulation and a therefore larger signal to noise ratio. Another advantage of the counting mask configuration is that since the active detectors are located one above the other, problems with light gradients are less severe. If a shift in detector location is necessary the same sized detectors can be used. Furthermore, the image of the illuminated ruling projected upon the detector ruling must shift the relative phases at least +90° or a −270° to cause the system to stop counting. This allows a great tolerance in the system before it does malfunction. And lastly the counting pattern is easier to rule since it is uniform with regard to both the primary and secondary patterns.

The general mathematical difference set theory used for constructing the reference masks is, from a theoretical standpoint, disclosed in an article entitled "A Survey of Different Sets" by Marshall Hall, Jr. in the proceedings of the American Mathematical Society, Volume 7, pages 975–986, 1956. However, no practical application of the difference set theory is suggested in this article.

The device of the present invention was constructed and the following set of parameters used:

$$v = 63$$

$$k = 31$$

$$\lambda = 15$$

The geometry of this pattern was 0, 1, 2, 3, 4, 6, 7, 8, 9, 12, 13, 14, 16, 18, 19, 24, 26, 27, 28, 32, 33, 34, 35, 38, 41, 45, 48, 49, 52, 54, 56.

The above parameters were chosen to provide a pattern where the bar width was narrow enough to provide for a large angular resolution yet wide enough to match the resolution of the focusing lens. Also the 63 units of the pattern allow it to be sufficiently large for the purposes of the preferred embodiment of the invention.

The operating circuitry of the angle readout subsystem is shown in FIG. 4 along with the associated tracking circuit which is more fully disclosed in the above mentioned copending application. More specifically, a detector array 31, sensitive to infrared radiation from the horizon of the earth, is coupled into a chopper 32, signal amplifier 33, and demodulator 34. The output of demodulator 34 is fed to a null detect trigger 35 which indicates that the output of the demodulator has reached zero. Because of the polarity arrangement of the detector array 31, a null indicates that the detector is now sensing the point of symmetry of the horizon since the amount of infrared energy above this point is equal to the amount below. At this point the tracking mirror 11 will be stopped in its rotation since it is locked on the horizon. This is initiated by the system logic 36 which is coupled to the mirror through a gate 37, integrating amplifier 38, and up and down amplifiers 39 and 40. The dashed line 41 represents the optical circuit from mirror 11 to the detector array 31. Searching is initiated by the "command input" also coupled to system logic circuitry 36.

In order to provide a marker or reference pulse to indicate a known position of the mirror and also to feed this information to the system logic circuitry 36 and a readout counter register 42, reference photodetectors 26′ and 27′ are coupled through a reference amplifier 43 to a reference trigger 44 which in turn is coupled to the system logic circuitry 36. Because of the opposed phase coupling of 26′ and 27′, a signal output 26″–27″ (FIG. 5) having double polarity (positive and negative) reference triggers and mirror normal triggers is produced. These triggers are coupled to summing and crossover networks 46 and 47.

Network 46 has as inputs inphase photodetectors $23a'$, $c'$ and $22a'$, $c'$. Network 47 has as inputs quadrature photodetectors $23b'$, $d'$ and $22b'$, $d'$. The mirror normal trigger provides switching between secondary counting photodetectors 22′ and 23′ as the mirror passes from one half of its field into the other. Crossover network 46 is coupled to inphase amplifier 48 and crossover network 47 is coupled to quadrature amplifier 49. Amplifiers 48 and 49 provide inphase and quadrature triggers 51 and 52 respectively to readout counter register 42 to provide a continuous count up until the register is again reset by reference trigger 44. In addition as discussed more completely in the above mentioned copending application interpolation outputs are also provided for higher digital accuracy.

In operation a search command input initiates searching for the earth's horizon. As mirror 13 which is associated with a horizon tracker crosses its reference position, counter 42 is reset. Counting continues until the tracker locks in on the horizon. The count stored in the counter is thus a measure of the angular displacement of the tracker and its associated mirror.

Thus the present invention provides improved optical apparatus in a subsystem for readout of the angular location of an infrared horizon sensor. Because of the higher modulation, greater accuracy in counting is achieved. Errors due to intensity gradients are reduced because of the closer packing of the detectors. Moreover a simpler lens design with adequate field coverage is achieved by the split fields. In addition more reliable reference pulses are produced because of the constant difference set format of the reference patterns.

We claim:

1. Optical apparatus for detecting motion of a rotatable object having a reference reflecting surface which includes: slitted primary and secondary counting masks and means for projecting light through said primary mask through a lens toward such surface to be reflected therefrom to strike said secondary mask at a location thereon which varies with movement of said rotatable object, the invention comprising said secondary counting mask with slits therein equal in number per unit length to said primary mask slits, all of said slits being directed parallel to the axis of rotation of said object, said rotatable object having a predetermined field of movement, said secondary mask having a first cluster of four mutually adjacent slitted sections intercepting reflected light substantially only when said object is in one half of said field, said sections being spaced so that the slits of bordering sections have a 90° phase difference, light sensitive means behind each of said sections for providing an electrical signal indicative of the rotation of said object in said one half of said field, said secondary counting mask including a second cluster of four mutually adjacent slitted sections spaced similarly to said first cluster and intercepting reflected light substantially only when the object is in the other half of said field, light sensitive means behind each of the sections of said second cluster for providing an electrical signal indicative of the rotation of said object in said other half of said field and switching means responsive to the field half in which said object is located to selectively receive data from the light sensitive means associated with that field half.

2. Optical apparatus as in claim 1 together with reference mask means for actuating said switching means said reference mask means including primary and secondary masks having a bar and slit pattern determined by a predetermined mathematical constant difference set.

3. Optical apparatus for determining the angular displacement of a movable object from a reference position which includes primary and secondary reference masks having transparent slits and opaque bars means for projecting light through said slits of said primary mask to strike said secondary mask at a location thereon which varies with movement of said movable object, light sensitive means behind said secondary mask for detecting said reference position of said movable object which will cause the slit pattern of the primary mask to strike the secondary mask exactly on the bar pattern of the secondary mask, the invention comprising secondary and primary reference masks having predetermined bar and slit patterns, the pattern of said secondary mask being the reverse of the pattern of said primary mask, said patterns being based on a mathematical constant difference set of the $vk\lambda$ type where $v$ is the modulus of the set which is the number of units in the set which determines the total number of slits and bars, $k$ is the number of members in the set which determines the number of bars in the pattern and $\lambda$ is in mathematical terms the number of ways the differences form in the set and the ratio $(\lambda + 1)/(v)$ determines the light transmittance of said first and second masks for positions of said movable object other than said reference position.

4. Optical apparatus as in claim 3 in which $v$ is equal to 63, $k$ is equal to 31, and $\lambda$ is equal to 15.

5. Optical apparatus as in claim 4 where the geometry of said pattern is 0, 1, 2, 3, 4, 6, 7, 8, 9, 12, 13, 14, 16, 18, 19, 24, 26, 27, 28, 32, 33, 34, 35, 38, 41, 45, 48, 49, 52, 56.

6. Optical apparatus as in claim 3 in which said primary mask includes first and second adjacent sections one of said sections being offset from the other by one unit.

7. Optical apparatus as in claim 6 where said secondary mask includes first and second sections corresponding to said sections of said primary mask.

8. Optical apparatus as in claim 7 where the light sensitive means behind said secondary mask provides a double polarity reference pulse at said reference position the direction of said polarity change indicating the direction of movement of said object.

9. Optical apparatus as in claim 3 in which said primary mask lies wholly within a single track and includes means for polarization coding said mask.

* * * * *